United States Patent

Wu

[11] 4,097,150
[45] Jun. 27, 1978

[54] OPTICAL DETECTION WEIGHING SYSTEM
[75] Inventor: Bosco Wu, Trumbull, Conn.
[73] Assignee: Pitney-Bowes, Inc., Stamford, Conn.
[21] Appl. No.: 708,444
[22] Filed: Jul. 23, 1976
[51] Int. Cl.² .................... G01B 23/36; G01B 9/02
[52] U.S. Cl. ........................ 356/72; 177/DIG. 6; 250/237 G; 356/111
[58] Field of Search ............ 356/72, 111, 170, 172, 356/106 R; 177/DIG. 6; 250/237 G, 231 SE; 116/DIG. 2, DIG. 3, 114 A, 129 K

[56] References Cited

U.S. PATENT DOCUMENTS

| 3,148,742 | 9/1964 | Giulie | 177/DIG. 6 |
| 3,884,581 | 5/1975 | Pryor | 356/111 |
| 3,923,110 | 12/1975 | Dal Dan | 177/DIG. 6 |

FOREIGN PATENT DOCUMENTS 46-18785  5/1971  Japan .......................... 250/237 G

OTHER PUBLICATIONS

Cook et al. "An Automatic Fringe Counting Interferometer for Use in the Calibration of Line Scales" Jr. of Research, Nat. Bureau of Standards, vol. 65c, Apr.–Jun. 1961, pp. 129–140.

Primary Examiner—John K. Corbin
Assistant Examiner—Wm. H. Punter
Attorney, Agent, or Firm—Robert S. Salzman; William D. Soltow, Jr.; Albert W. Scribner

[57] ABSTRACT

An optical detection system for a weighing scale includes an apparatus for generating a moire fringe. Unlike prior moire-type systems, however, the present scale is constructed with a substantially rigid tare, so that movement of the moire is limited to only a portion of one fringe line. Movement of the tare, and the pan carrying the load, are visually not apparent. Response time is greatly enhanced by the inventive system and accuracy is improved due to minimized hysteresis loss. The invention detects an optical shifting of the fringe line, rather than a counting of a number of fringe lines as with prior highly deflective scale systems.

8 Claims, 5 Drawing Figures

OPTICAL DETECTION WEIGHING SYSTEM

The invention pertains to an optical detection system that includes an apparatus for providing a moire fringe, and more particularly to a detection system that utilizes only a small portion of one cyclic moire fringe.

BACKGROUND OF THE INVENTION

The use of moire-type optical sensors for measuring deflection or displacement is well known, as shown in U.S. Pat. Nos. 2,886,717; 2,886,718; 2,861,345; and 3,154,688, etc.

In all of these prior systems, the moire lines are caused to move past a detector in response to the displacement. The detectors count the number of lines and displacement is calculated as a function of the number of detected lines.

While these prior moire systems are accurate to a high degree, their response times are also usually long due to their large deflections.

The present invention concerns itself with a moire-type system that maintains a high accuracy in its measurement, but which does not do so at the expense of a long response time. The present system, when incorporated within a scale, uses a substantially rigid tare. This tare will have a diminutive deflection, i.e. it will not have a visually apparent displacement. Naturally, such a system will have: (1) a very fast response time, (2) will not require the usual degree of damping of prior systems, and (3) will have good repeatability and accuracy, because the materials are not being highly stressed. Low ordered stresses in the materials allow for obediance to hook's law, and to a minimization of internal losses (hysteresis).

SUMMARY OF THE INVENTION

The invention relates to an optical detection system. The system includes apparatus for generating at least one moire fringe, and means for detecting an optical shift in the moire line.

The moire fringe is generated by a light source and a pair of optical gratings. One grating of the pair is fixed, while the other grating is free to move in proportion to the displacement or deflection to be measured. When applied to a weighing scale, the present optical detection system will have one grating fixed to the movable tare and movable therewith, and the other optically fixed with respect to tare movement.

Only a repeatable (generally linear) portion of a cyclic moire fringe is used to detect the weight to be measured. The weight is determined by observing the optical shift (from light to dark or vice versa) of the moire line. Because only a small displacement is required for large weight determinations (wide weight range), the tare of the scale is constructed to be extremely rigid. So much so, that the tare in most applications will have no apparent visual movement. Of course the tare will move in the physical sense, but to the casual observer, the few thousandths of an inch of movement will go undetected.

Naturally such a system, as described above, will have a very quick response time, and will not tax or greatly stress its materials. This has the advantage of minimizing internal losses due to hysteresis. In addition, such a system will be able to function in a highly repeatable range, which will further enhance the accuracy of its operation.

It is an object of this invention to provide an improved optical detection system of the moire-type;

It is another object of the invention to provide an improved weighing scale using a moire-type optical detection system;

It is a further object of this invention to provide a moire-type optical detection system whose full operating range extends over only a portion of one cyclic moire fringe, and whose detection apparatus senses an optical shift in the portion of the fringe as a function of a displacement to be measured.

These and other objects of the invention will become more apparent and will be better understood with reference to the following detailed description, taken in conjunction with the attached drawings, in which.

DETAILED DESCRIPTION

Figure 1:
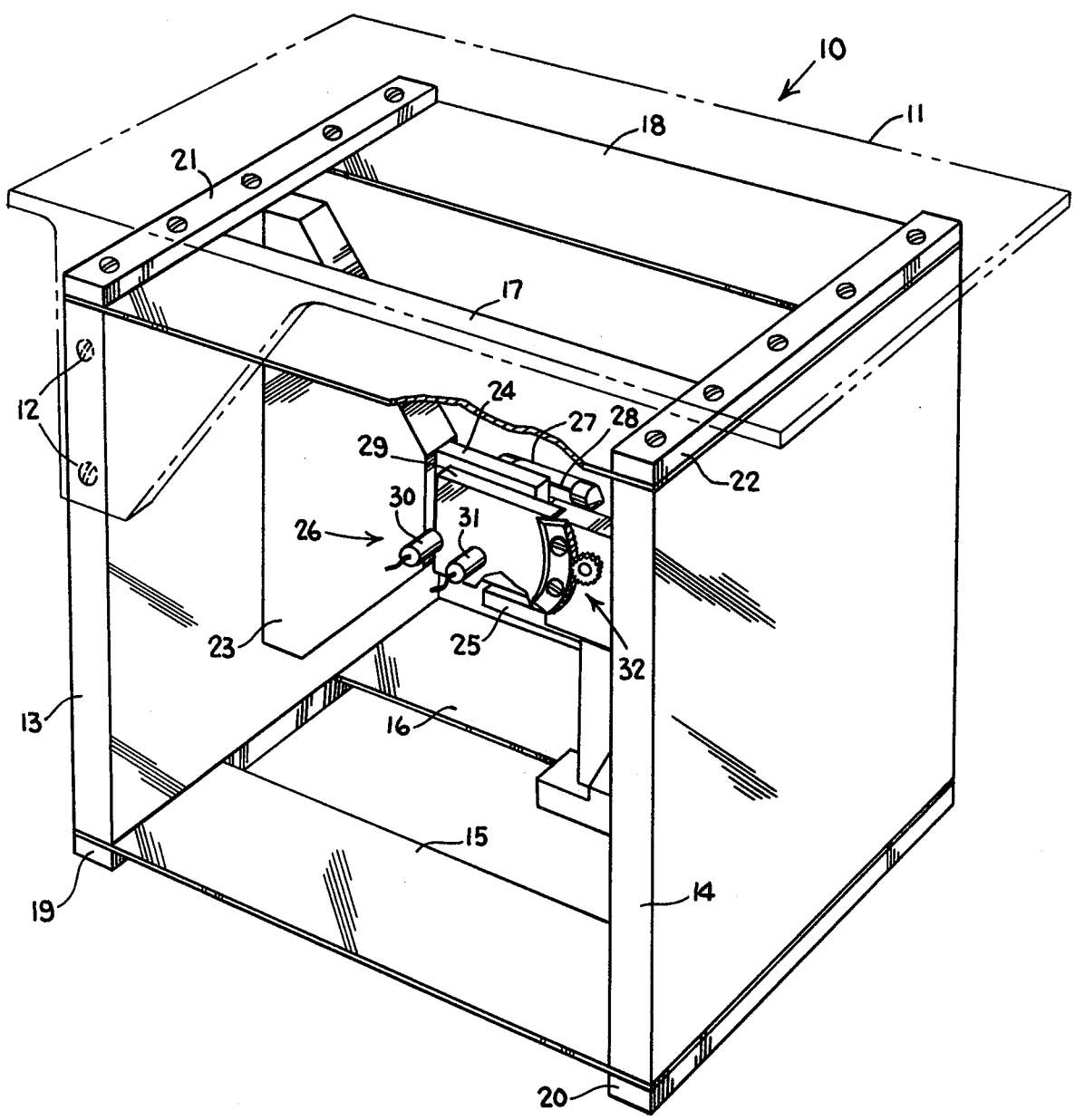
FIG. 1 is a schematic perspective view of a weighing scale and the optical detection system of this invention.

Now referring to FIG. 1, a schematic perspective view of a weighing scale and optical detection system of the invention is shown. The weighing scale depicted generally by arrow 10, is of the leaf spring type, although other constructions could easily accommodate the inventive optics.

The scale comprises a pan 11, on which a load to be weighed is placed. The pan 11 is bolted via screws 12 to the tare of the scale. The tare includes two side walls 13 and 14, respectively. Between the side walls spans four leaf spring strips 15, 16, 17 and 18 respectively, that are affixed to the walls 13 and 14 by anchoring strips 19, 20, 21 and 22.

Wall 13 is free to move with respect to the stationary wall 14. Wall 13 carries a flange member 23, that supports an optical grating member 24. The optical grating member 24 is free to move along with the movable wall 13 and the pan 11, when a weight is placed upon pan 11.

Unlike the usual highly deflecting tares of other leaf spring scales, the tare of the present scale is made to deflect only diminutive amounts in response to the load placed on pan 11. The subject scale may be designed, in one example, to deflect only several thousandths of an inch for each ounce or pound placed on the pan 11.

The stiffness can be designed into the tare in at least two ways: (a) the leaf spring strips 15, 16, 17 and 18 may be made very thick to have the desired stiffness, or (b) the leaf spring strips 15, 16, 17 and 18 may be made in the usual flexible manner, and a compression member 25 may be placed in contact, and directly below the movable grating member 24 or the movable wall 13. This compression member 25 will allow the grating member 24 to deflect or be displaced only a few thousandths of an inch with each load increment.

The stiffness of the tare is designed for the purpose of operating within new optical limits consistent with the detection system of this invention, as will be explained in more detail, hereinafter.

The optical detection system is generally and schematically shown by arrow 26. The optical detection system 26 consists of a light source 27, which is generally an incandescent lamp having a straight filament 28. The light from filament 28 is usually magnified and concentrated by a lens (not shown) positioned between the grating member 24 and the light source 27.

The light from the filament is passed through two optical grating members 24 and 29, respectively, to a pair of photodetectors (phototransistors 30 and 31 as shown).

The optical grating members 24 and 29 contain Ronchi Rulings that will provide an interference pattern, or in other words will modulate the light beam to provide cyclic parallel moire fringes.

Grating member 24 is movable with respect to the fixed grating member 29. Grating member 29 is adjustably fixed to the fixed wall member 14 via an angle adjustment gearing device, generally and schematically shown by arrow 32. The gratings of the fixed grating member 29 are positioned at a slight screw angle with respect to the gratings of the displaceable grating member 24. This difference in angle is what will provide the optical interference pattern (moire fringes).

A better understanding of the moire phenomena and the details of the grating and optical construction of this detection system may be obtained with reference to application Ser. No. 664,579, filed: Mar. 8, 1976, now U.S. Pat. No. 4,047,585 and assigned to the same assignee.

Figures 2, 3:
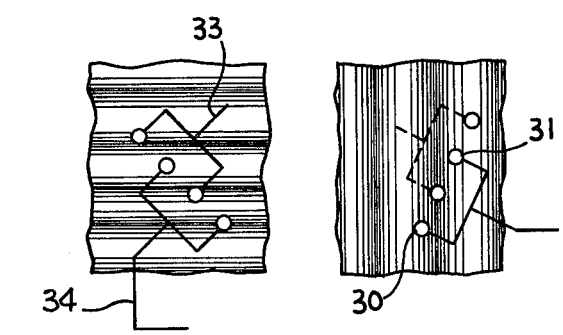
FIG. 2 is a schematic view of a prior art moire fringe pattern and the location of the photodetectors with respect to the moire pattern.
FIG. 3 is a schematic view of the inventive moire fringe pattern comprising a single moire fringe line, and the location of the photodetectors with respect to the moire fringe line.

Normally, in the highly deflective system described in the above-mentioned application, the photodetectors are arranged usually in two pairs 33 and 34 as shown in FIG. 2. These photodetectors are arranged across the light and dark areas of the fringes as shown, and detect the number of fringes (count the fringes) moving past them.

Figure 4:
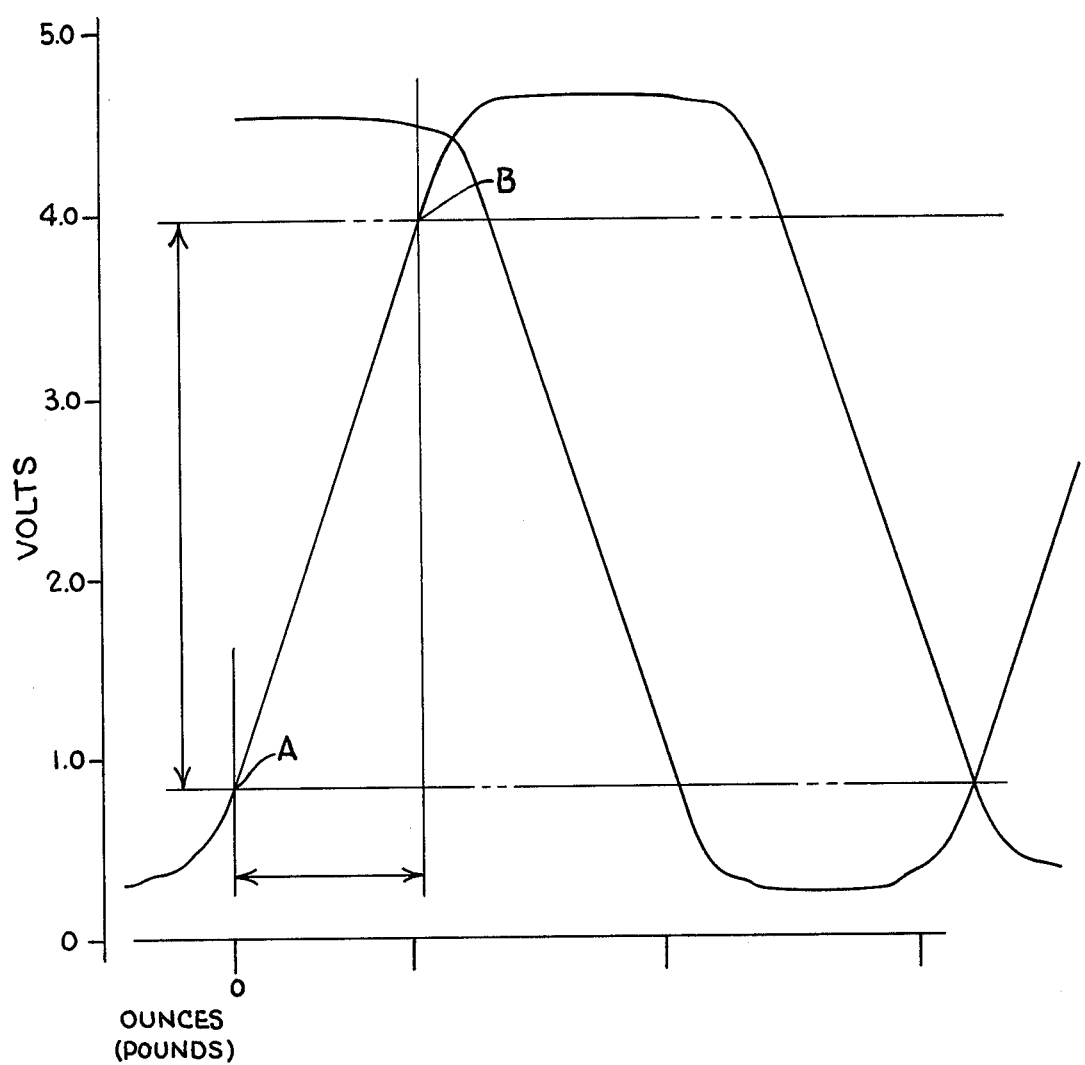
FIG. 4 is a diagram of the voltage output of the optical detection weighing system shown in FIG. 1, versus a load input imposed upon the scale.

In the inventive optical detector 26, however, there is need for only one pair of detectors (phototransistors 30 and 31 of FIG. 1). The detector pair 30, 31 is positioned across the moire pattern as illustrated in FIG. 3. Detectors 30 and 31 are positioned across only one fringe line, each in a transitional area between absolute light and dark sections of the fringe pattern. The optical and electrical aspects of the grating and detectors arrangement are such, that the voltage output of the detectors with respect to displacement (weight of the load) is very repeatable and generally linear as depicted in FIG. 4. Put in other words, the detection system operates over a small portion of a cyclic moire fringe, which portion is highly repeatable, and generally linear. The portion in question is defined as the limits between points "A" and "B."

Figure 5:
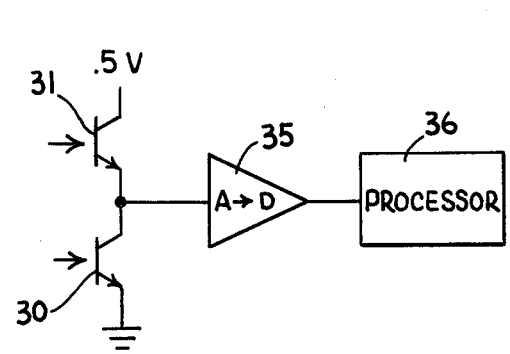
FIG. 5 is a schematic diagram of the electrical circuitry needed to process the optical changes in the inventive system.

In order to process the detector output to provide a numerical indication of weight or displacement, the voltage from detectors 30 and 31 is fed to an analogue-to-digital converter 35 depicted in FIG. 5. The output of the converter 35 is then fed to a processor 36, which puts the information in usable form for display or print out purposes.

While the detection system of this invention has been described specifically with respect to one embodiment of a weighing apparatus, the invention should not be so limited, but should extend to other systems wherein an accurate measure of displacement, deflection, or weight is desired.

Having thus described the invention, what is desired to be covered by Letters Patent is presented by the appended claims.

What is claimed is:

1. An optical detection weighing system, comprising:
a tare support means for supporting an article to be weighed through a weighing range, said tare support means being substantially rigid so that displacement of the tare support means through the weighing range will not be substantially visually apparent; and
an optical detector for determining the extent of the tare support means displacement, the detector including a first optical grating and a second optical grating, said first optical grating being fixed to the tare support means and being displaceable therewith through said weighing range, said second optical grating being operatively fixed with respect to the displacement of the first optical grating and said tare support means, the optical detector further including a light source means, the optical gratings being positioned with respect to each other and said light source means for modulating light from said light source means to provide an optical interference pattern having at least one moire-type fringe, and photodetector means diposed adjacent the optical gratings to detect an optical shift in one moire-type fringe in response to displacement of the tare support means, and provide an electrical output proportional to the optical shift of said moire-type fringe, said optical gratings and said photodetection means being constructed to operate in a generally linear, repeatable portion of a cyclic moire fringe output throughout the weighing range, whereby the weight of an article may be determined.

2. The optical detection weighing system of claim 1, wherein said photodetector means provides a substantially linear voltage output with respect to displacement of the tare support means.

3. The optical detection weighing system of claim 1, further comprising angle adjustment means connected to one of said optical gratings for adjusting an angle of the second optical grating with respect to the first optical grating.

4. The optical detection weighing system of claim 1 wherein said photodetection means comprises at least one pair of phototransistors.

5. The optical detection weighing system of claim 1, wherein said light source means provides a light beam and includes an incandescent lamp having a substantially straight filament.

6. The optical detection weighing system of claim 1, wherein said tare support means includes at least one pair of leaf springs.

7. The optical detection weighing system of claim 6, wherein said tare support means comprises four leaf springs arranged in a parallelogram-type structure.

8. An optical detection system, comprising a first optical grating and a second optical grating, said first optical grating being fixed to a deflecting member and being displaceable therewith through a deflection range, said second optical grating being operatively fixed with respect to the displacement of the first optical grating, the optical deflection system further including a light source means, said optical gratings being positioned with respect to each other and said light source means for modulating light from said light source means, to provide an optical interference pattern having at least one moire-type fringe, and photodetector means disposed adjacent the optical gratings to detect an optical shift in a generally linear, repeatable portion of one moire-type fringe in response to displacement of the first grating and provide an electrical output proportional to the optical shift of said moire-type fringe, whereby the deflection of said member may be determined.

* * * * *